United States Patent
Desjoyeaux

(10) Patent No.: US 9,079,364 B2
(45) Date of Patent: Jul. 14, 2015

(54) METHOD FOR PRODUCING A PART COMPRISING A HOLLOW BODY MADE FROM A COMPOSITE MATERIAL

(75) Inventor: Bertrand Desjoyeaux, Sainte Adresse (FR)

(73) Assignee: AIRCELLE, Gonfreville l'Orcher (FR)

( * ) Notice: Subject to any disclaimer, the term of this patent is extended or adjusted under 35 U.S.C. 154(b) by 530 days.

(21) Appl. No.: 12/995,231

(22) PCT Filed: Apr. 7, 2009

(86) PCT No.: PCT/FR2009/050590
§ 371 (c)(1),
(2), (4) Date: Nov. 30, 2010

(87) PCT Pub. No.: WO2010/000990
PCT Pub. Date: Jan. 7, 2010

(65) Prior Publication Data
US 2011/0081511 A1    Apr. 7, 2011

(30) Foreign Application Priority Data
Jun. 11, 2008  (FR) .................................... 08 03240

(51) Int. Cl.
| B32B 1/02 | (2006.01) |
| B29C 70/24 | (2006.01) |
| B29B 11/16 | (2006.01) |
| B32B 1/08 | (2006.01) |

(52) U.S. Cl.
CPC ............... B29C 70/24 (2013.01); B29B 11/16 (2013.01); *Y10T 428/1352* (2015.01)

(58) Field of Classification Search
CPC ..................................... B32B 1/02; B32B 1/08
USPC ............ 428/34.1, 34.2, 35.7, 35.9, 36.9, 35.2
See application file for complete search history.

(56) References Cited

U.S. PATENT DOCUMENTS

| 6,004,123 A | 12/1999 | Buckley |
| 6,284,089 B1 * | 9/2001 | Anderson et al. .......... 156/304.3 |
| 2002/0123288 A1 * | 9/2002 | Davies et al. ................. 442/327 |

FOREIGN PATENT DOCUMENTS

| EP | 0749825 A2 | 12/1996 |
| FR | 2893683 A1 | 5/2007 |
| GB | 2410921 A | 8/2005 |
| WO | 0242044 A1 | 5/2002 |
| WO | 2004069527 A1 | 8/2004 |
| WO | 2006069581 A1 | 7/2006 |
| WO | 2007031649 A1 | 3/2007 |
| WO | 2007060306 A1 | 5/2007 |

OTHER PUBLICATIONS

International Search Report PCT/FR2009/050590; Dated Jun. 25, 2010.

* cited by examiner

*Primary Examiner* — Marc Patterson
(74) *Attorney, Agent, or Firm* — Brinks Gilson & Lione

(57) ABSTRACT

The invention relates to a method for producing a part comprising a hollow body made from a composite material, using preforms (11, 12), said method including the following steps: a step in which the preforms are disposed around a suitable supporting element (1) such that the coupling edges of each preform (11, 12) overlap, and come into contact, with a coupling edge of another preform (12, 11); a step in which the coupling edges of each preform are joined along a seam; and a step in which the supporting element is removed and a mold core is inserted in its place before the assembly is placed inside a mold and resin is injected using an RTM/LRI method, prior to the polymerization of said resin.

11 Claims, 2 Drawing Sheets

METHOD FOR PRODUCING A PART COMPRISING A HOLLOW BODY MADE FROM A COMPOSITE MATERIAL

TECHNICAL FIELD

The present invention concerns a method for producing a part comprising a hollow body made from a composite material.

The present invention more particularly concerns the production of highly charged structures having a hollow main body. One may cite in particular the production of landing gear rods, bogeys, attachment mast in a turbojet engine nacelle, turbojet engine pylon, etc.

BACKGROUND

Several methods are known for manufacturing composite parts with hollow bodies, in particular the RTM/LRI (Resin Transfer Molding/Liquid Resin Infusion) methods and the prepreg method. Also known are ply draping or filament winding techniques that can be applied to either of the cited methods.

In an RTM/LRI method, an assembly of fibrous elements is positioned in a particular manner around a supporting element. This fibrous element assembly forms a preform that, with its supporting element, is then placed in a mold inside which a resin is injected, generally under a vacuum or pressure. The resin is then polymerized, thereby forming a rigid and light composite material made up of fibers and polymerized resin.

The RTM/LRI method has great flexibility and allows the production of pieces with a complex geometry. Indeed, the fibers of the fibrous elements initially being dry, they can be put into place more easily to assume the shape of the supporting element.

The RTM/LRI method also has the advantage of requiring fewer assembly operations, since this possibility of producing pieces with complex shapes makes it possible to avoid making several pieces with less complex shapes to then assemble them together.

However, the fibrous elements initially being dry, their fibers are also more easily susceptible to changing orientation or having alignment defects before casting and polymerization of the resin.

Given that in such a composite material the alignment of the fibers defines and determines the stress transmission lines, in particular in compression and buckling, it is understood that the presence of alignment defects of the fibers in the final pieces has negative repercussions on the mechanical properties for picking up and transmitting stresses of said piece.

This defect can be improved by using a preform including a very small resin portion that serves as fixer in order to strengthen the connection of the fibers to each other, this method requiring, other than the operation of adding the fixer, a stoving operation of the formed preform to activate the fixer.

In a prepreg method, the fibrous elements are no longer dry, but preimpregnated with at least partially polymerized resin.

The fact that the fibers of these fibrous elements are already impregnated with resin greatly limits their mobility and change of orientation.

However, the prepreg method has drawbacks and in particular does not allow, or allows with difficulty, the production of pieces with complex geometry, the resin greatly limiting the shaping of the fibrous elements. It is therefore also difficult to obtain a good compression rate of the fibers between the supporting element and the mold during the final polymerization.

Moreover, such a method multiplies the manufacturing steps, since the fibrous elements must undergo a preimpregnation before draping and possibly a partial pre-polymerization before shaping and final polymerization.

There is therefore a significant interest in improving the RTM/LRI methods and providing a method making it possible to keep the advantages thereof while also ensuring proper orientation of the fibers, good compaction thereof in significant numbers.

Several prior art documents have already tried to resolve this problem.

Document WO 2007/060306 describes a method for producing a rod in a composite material from a single dry preform shaped before casting of the resin. In this method, the preform has opposite edges each having a complementary beveled surface created during its winding around the supporting element, said edges being superimposed before being joined by the resin.

However, in such a method, there is still a significant risk of movement of the fibers before molding. This method also has drawbacks related to mass optimization to ensure the alignment of the longitudinal fibers.

Document WO 2007/031649 describes a method for manufacturing a composite piece from a plurality of dry and preimpregnated preforms. The correct alignment of the fibers is ensured locally by this use of preimpregnated preforms.

However, this method still requires several polymerization steps.

The filament winding techniques, aside from having the same difficulties as mentioned above with the RTM or prepreg methods, can have the constraint of fiber continuity to perform the winding and therefore a handicap for optimizing the mass of the obtained structure.

BRIEF SUMMARY

The present invention aims to offset the drawbacks previously mentioned and to that end comprises a method for producing a part comprising a hollow body made from a composite material using preforms, comprising the following steps:

positioning the preforms around a suitable supporting element such that the coupling edges of each preform overlap, and come into contact, with a coupling edge of another preform, joining coupling edges of each preform along a seam;

removing the supporting element and inserting a mold core in its place before the assembly is placed inside a mold and resin is injected using an RTM/LRI method, followed by a polymerization of the resin.

Thus, by carrying out a seam step between the coupling edges of the preforms, the resistance of the latter parts is greatly increased around the supporting element, and consequently so is the cohesion of the fibers.

According to a first embodiment, the connection of the coupling edges of the preforms is done according to a seam stitching method, commonly called "stitching" or "blind stitching," seam of the chain sewing type that can be obtained by using a single fiber.

According to a second embodiment, the connection of the coupling edges of the preforms is done using a method commonly called "tufting."

According to a third embodiment, the connection of the coupling edges of the preforms is done using a method commonly called "Z-pinning."

Preferably, the seam is made using a dry carbon fiber.

According to one embodiment, the carbon fiber is a pultruded fiber, i.e. coated with resin and polymerized (Z-pinning inter alia).

Advantageously, the preforms are dry preforms. Thus, the production method does not require a step for preimpregnating the preforms.

Preferably, at least part of the preforms are initially done flat.

Alternatively or complementarily, at least part of the preforms are initially produced by low forming.

Alternatively or complementarily, at least part of the preforms are previously shaped between a punch and a vacuum or pressurized vessel before placement on the supporting element.

Preferably, each preform is maintained on the supporting element before sewing owing to retention means.

According to a first embodiment, the preform is retained via ends of its coupling edges.

According to a second embodiment, the retention means comprises a fibrous membrane attached on the preform and gripping it on the supporting element.

Preferably, the preform is retained using clips equipping the supporting element and able to receive one end of the corresponding coupling edge or fibrous membrane.

Advantageously, the method comprises an additional step for compacting the preforms on the core or on the supporting element by expanding the latter towards the mold or an equivalent rigid membrane.

Also advantageously, the preforms have beveled coupling edges. A beveled edge allows a broader covering surface with an edge of another preform while ensuring the suitable thickness of the coupling area.

The present invention also concerns a part comprising a hollow body made from a composite material that can be obtained using one of the methods according to the invention.

BRIEF DESCRIPTION OF THE DRAWINGS

The present invention will be better understood using the following detailed description done in reference to the appended diagrammatic drawing showing the different steps of the method according to the invention and in which.

DETAILED DESCRIPTION

The present invention concerns a method for producing a part comprising a hollow body, such as a rod, from a composite material using preforms.

In the case in point, the present invention is illustrated by a part made from two dry preforms 11, 12 cut out from a pattern for producing said part and initially prepared flat. Each preform therefore has an adapted shape, a specific geometry, a number of fibrous layers able to fill the final volume to be molded after forming, etc. . . . Each preform 11, 12 has at least one layer 111, 121 of transverse fibers extending from one lateral end 112, 113, 122, 123 to the other with a sufficient length.

Of course, it may be considered to prepare some or all of the preforms 11, 12 by light forming. Moreover, the method according to the invention is not limited to a given number of preforms.

Although the method is intended to facilitate the use of dry preforms, it is, however, possible to consider using some preimpregnated preforms.

Figure 1:
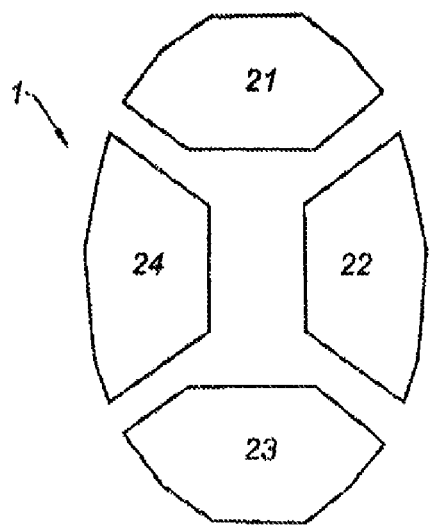
FIG. 1 is a diagrammatic transverse cross-sectional view of a supporting element for preforms.

A supporting element 1 is diagrammatically illustrated in FIG. 1.

It will be noted that the supporting element 1 is made up of several elements, shown in FIG. 1 in four pieces 21, 22, 23, and 24, the assembly of which constitutes a shape close to the molding geometry, and at least one element of which is able to move, in order to be able to vary the winding perimeter and contribute to later compacting operations, and also to be able to remove the supporting element after the forming operations.

An inner mechanical device (not shown) makes it possible to slightly expand or contract the pieces 21, 22, 23, 24 to slightly increase or reduce the perimeter of the supporting element 1.

Figure 2:
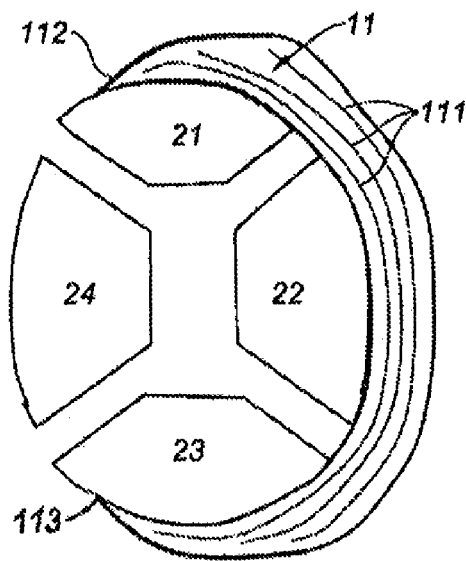
FIG. 2 is a diagrammatic transverse cross-sectional view of the supporting element of FIG. 1 on which a first preform has been positioned.

The first step of the method according to the invention is diagrammatically illustrated in FIG. 2 and is composed of winding, on the supporting element 1, the first preform 11, the winding and forming of the preform 11 being controlled by the movements of rigid outer shapes (not shown), stretched flexible shapes (not shown), or by traction on the longest transverse fibers 111, 121, or by a combination of these forms, or by a succession of steps ending with at least one of the above operations, and that can be preceded by a forming operation between the supporting element 1 or another supporting element with a close shape and flexible vessel in vacuum, or pressed rigid counterpart.

The ends 112, 113, 122, 123 of the longest and continuous transverse fibers 111, 121 from one lateral edge to the other of the preform 11, 12 are then flanged on the supporting element 1 by one or several retention means. After this, the forming system can be dismissed.

It will be noted that the preform 11 on the supporting element 1 has beveled ends 112, 113. These ends 112, 113 can result from the winding of the preform 11. In fact, if the inner and outer fibers 111 have substantially the same length, the corresponding angular section will be more significant for the inner fibers 111, wound around a smaller radius. Beveled ends 112, 113 result therefrom.

However, this normal formation of beveled ends 112, 113 rarely yields long enough ends. It is therefore possible to provide preforms 11, 12 having flat, beveled edges, this bevel length being accentuated by the winding.

These beveled ends 112, 113 are intended to form a coupling edge intended to be covered by a corresponding coupling edge of the second preform 12, formed by a beveled end 122, 123 thereof.

Once the first preform 11 is wound around the supporting element 1, it is kept in place using retention means, by flanging, or even tensioning of circumferential fibers. Various retention means can be considered.

Figure 3:
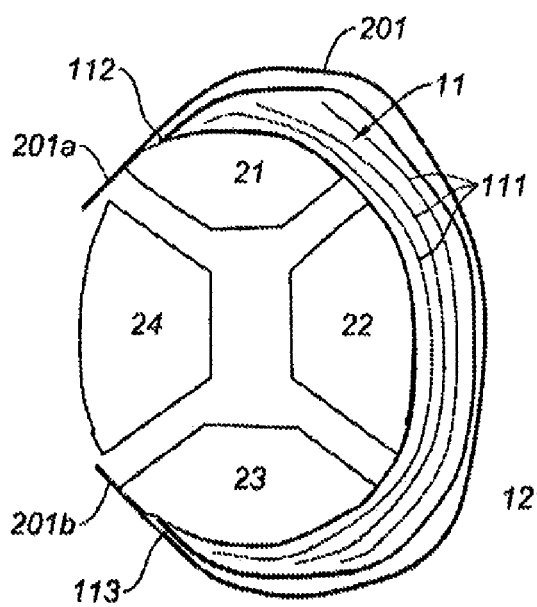
FIG. 3 is a diagrammatic cross-sectional illustration of FIG. 2 in which the first preform is retained via a fibrous membrane.
Figure 4:
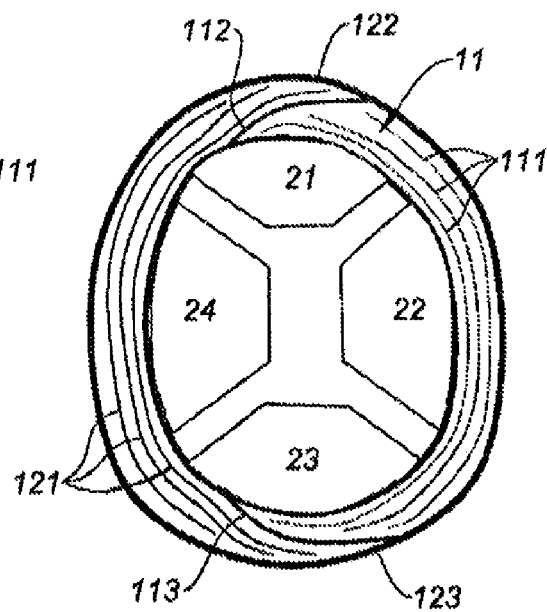
FIG. 4 is a diagrammatic transverse cross-sectional illustration of the supporting element of FIG. 2 on which a second preform has been positioned.

In the case in point, FIG. 3 presents a retention means comprising positioning, on the first preform, a fibrous membrane 201 gripping it. The fibrous membrane 201 has lateral ends 201a, 201b that are then fastened in the supporting element 1 using any adapted means, preferably by clipping inside a slot formed in the supporting element 1. The fibers making up the retention ends 201a, 201b can, in another alternative, be circumferential fibers that are part of the preform 11 whereof the ends will be retained in the device.

The fact that the circumferential fibers, of the preform 11 or the fibrous membrane 201, are flanged relative to the supporting element makes it possible for any preform portion defined in said fibers to be contained in a maximum perimeter and thus to keep a compacting level between the layers close to that generated by the forming system, making it possible to manage the thickness by layer in the dry state.

The clipping may be done between two pieces 21, 22, 23, 24 of the supporting element 1, which makes it possible to open the clip by simple expansion of the pieces of the supporting element 1.

Thus with the first preform 11 retained and stretched, the second preform 12 is wound on the supporting element 1 using the same forming principles, possibly using the same forming devices used for the first preform 11 if the geometry allows it. This second preform 12 covers the rest of the supporting element 1 and has beveled ends 122, 123 covering the beveled ends 112, 113 of the first preform 11 at a coupling area.

Figure 5:
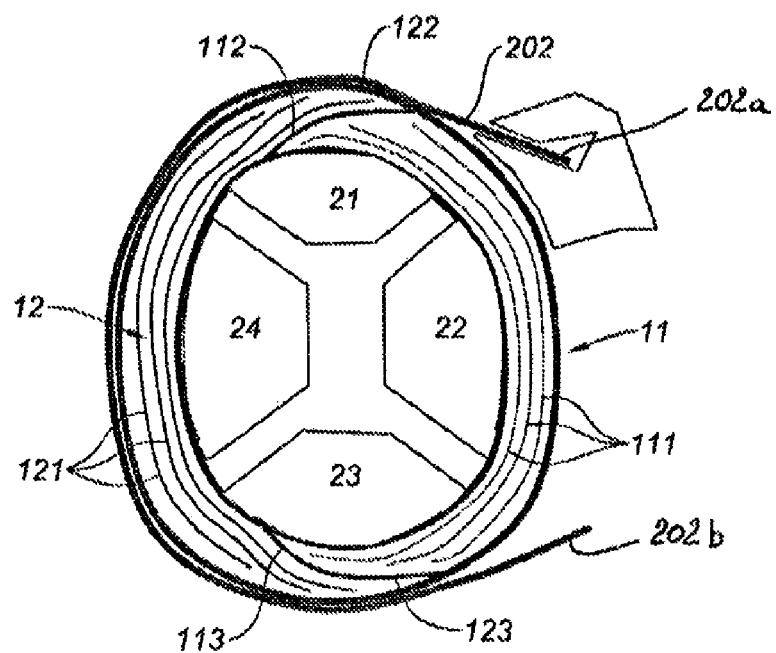
FIG. 5 is a diagrammatic cross-sectional illustration of the assembly of FIG. 4 in which a second preform is retained via a second fibrous membrane.

The ends 122, 123 of the second preform 12 are then also flanged and kept in place using the retention device, in particular by clipping. As for the first preform 11, FIG. 5 shows the retention of the second preform using a second fibrous membrane 202, which is stretched and clipped in order to keep the outer perimeter described by the preform 12.

The retention means are adjusted and the preforms 11, 12 stretched so as to obtain an outer perimeter close to the final molding outer perimeter in order to obtain correct alignments of the circumferential fibers during molding.

The fibrous membranes 201, 202 will be made up of fibers of the same nature or of different natures from the fibers of the preforms 11, 12.

As for the first preform 11, the ends 202a, 202b, 202a and 202b can be formed by circumferential fiber margins of the second preform 12.

Figure 6:
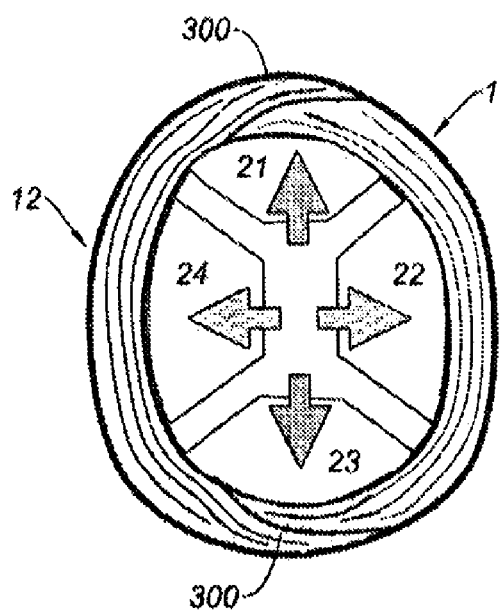
FIG. 6 is a diagrammatic illustration of the compacting step.

FIG. 6 then shows a compacting step of the preforms 11, 12. Through expansion or separation devices of the pieces 21, 22, 23, 24 of the supporting element 1, it is then possible to increase the perimeter described by the inner transverse fibers, obtaining a compacting of the coupling areas at the same time, which contributes to aligning the circumferential fibers of inner layers.

It is preferable to keep the outer forming devices in place around the assembly, to confine the outer perimeter by limiting the tension on the retention means of the second preform 12, however the flanging systems of the only preform 11 will have to be released during this operation to allow the expansion sliding of the inner perimeter.

As for the first preform 11, the ends 202a, 202b can be made up of margins of circumferential fibers of the second preform 12.

Figure 7:
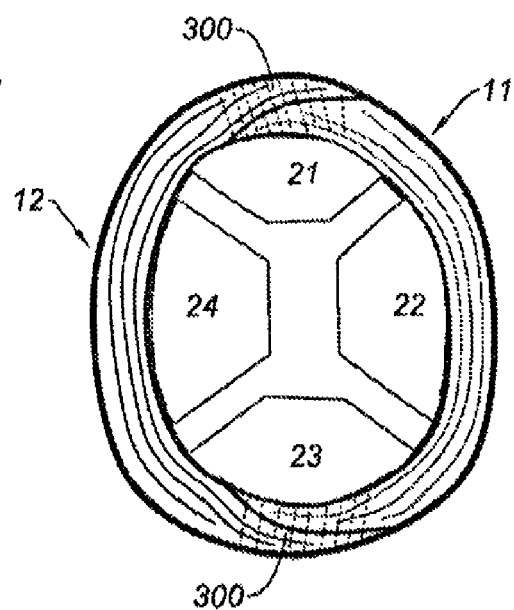
FIG. 7 is a diagrammatic illustration of the step for sewing the covering edges of the two preforms on the supporting element.

As shown in FIG. 7, the preforms 11, 12 are then made integral at their coupling areas in a sewing step.

This operation can be done using known methods of sewing (stitching, blind stitching), tufting, or Z-pinning.

Preferably, a fiber 300 will be chosen of the same nature as the fibers making up the preforms 11, 12 but with a low enough count to be able to stitch it.

In the case of Z-pinning, the fiber 300 may be pultruded, i.e. coated with resin and polymerized, before insertion into the assembly of preforms 11-12.

A stitching pitch will be chosen procuring sufficient cohesion for the assembly while preserving a slight possibility of sliding of the layers in relation to each other.

It will be noted that the preforms 11, 12 are generally formed by fibers woven in three dimensions. In the case where a preform 11, 12 is made having beveled ends, these areas generally cannot be made in three dimensions and rather include a superposition of layers woven in two dimensions. The sewing step makes it possible to restore this three-dimensional weaving locally, which provides better strength and resistance of the assembly.

For the sewing operation, the outer forming devices can be removed if the flanging systems of the circumferential fibers 202 are sufficient, in a contrary case, i.e. if the mastery of the outer perimeter requires the maintenance of outer compacting shapes, these outer shapes will be made in pieces making it possible to expose, over time, an access window for accessing the outer surface to perform the insertion of the coupling fibers.

The outer retention means as well as the forming device can then be disassembled after the sewing operation or during it when the sewing already allows sufficient resistance.

The non-connected ends of the coupling areas, ends that were then clipped, can be cut or left free.

The supporting element 1 is retracted or disassembled into pieces 21, 22, 23, 24 (of course, the number of pieces making up the supporting element 1 is not limited) to remove the complete preform thus formed.

It will also be noted that, for better effectiveness, the sewing can be done on the entire thickness of the complete preform. The supporting element 1 will then have martyr areas located at coupling areas for the passage emerging from the sewing needle. This area may be either made of a soft penetrable material (cellular foam, for example) or a dry fibrous structure of substantially the same type as the preform, or a perforated structure, such as a honeycomb substructure, or a slotted tool, if it is possible to precisely master the through positions of the needles.

In the case where more than two preforms are used, it may of course be possible to carry out sewing steps according to the described method so as to come back to cases of two preforms.

It will also be noted that it is not mandatory for both ends of each preform to have the same covering order with the other preforms. In the illustrated case, it is therefore not required that the ends 112 and 113 both be covered by the ends 122 and 123. It is of course completely possible for the end 112 to be covered by the end 122, but for the end 113 to cover the end 123, or vice versa.

The described method makes it possible to achieve, after the compacting and sewing step, fiber volume rates very close to those that will be obtained during molding and an overall cohesion of the orientations of the fibers facilitating the manipulation of the complete preform.

The following step therefore comprises an RTM/LRI molding step according to a known method.

To do this, a mold core is introduced inside the preform in one or several pieces depending on the geometry of the part. Also known are cores in vessel form, inflated inside the preform.

However, the core will generally be made in several elements having slopes such that they produce radial relative movements when they are put in contact with the complete preform so as to keep the fibers suitably aligned and thus contribute to aligning the circumferential fibers.

The core and preform assembly is inserted into the mold device generally comprising at least two matrices. A final compacting is done by closing the outer matrices. It is also possible to add a final expansion of the core thereto.

The consolidation of the fibrous structure is ensured by injecting a liquid resin according to an RTM/LRI method as well as through a polymerization of said resin following a suitable mechanical-thermal cycle.

Depending on the needs, final machining steps may be provided.

Of course, the invention is not limited only to the embodiments of this rod described above as an example, but on the contrary encompasses all alternatives of structures comprising hollow bodies.

The invention claimed is:

1. A method for producing a part comprising a hollow body made from a composite material using preforms comprising the following steps:
    positioning the preforms around a supporting element such that coupling edges of each preform overlap and come into contact to form a beveled coupling edge and to form a hollow closed geometry,
    joining coupling edges of each preform along a seam; and
    removing the supporting element and inserting a mold core in its place before an assembly is placed inside a mold and resin is injected using an RTM/LRI method, followed by a polymerization of the resin,
    wherein each preform is kept on the supporting element by retention means attached to the preform and gripping the preform on the supporting element such that the preform is stretched to obtain an outer perimeter close to a final molding outer perimeter and to obtain alignment of circumferential fibers of the preform during molding.

2. The method according to claim 1, wherein the connection of the coupling edges of the preforms is done using a "stitching" or "blind stitching" stitching seam method.

3. The method according to claim 1, wherein the connection of the coupling edges of the preforms is done using a "tufting" sewing method.

4. The method according to claim 1, wherein the connection of the coupling edges of the preforms is done using a "Z-pinning" sewing method.

5. The method according to claim 1, wherein the seam is produced using a carbon fiber.

6. The method according to claim 5, wherein the carbon fiber is a pultruded fiber coated with resin.

7. The method according to claim 1, wherein the preforms are dry preforms.

8. The method according to claim 1, wherein at least part of the preforms are initially produced flat.

9. The method according to claim 1, wherein at least part of the preforms are previously shaped between a punch and a vacuum or pressurized vessel before placement on the supporting element.

10. The method according to claim 1, wherein it comprises an additional compacting step, done before a sewing operation, for compacting the preforms on the core or on the supporting element by expanding the latter towards the mold or an equivalent rigid membrane.

11. A part comprising a hollow body made from a composite material obtained using the method according to claim 1.

* * * * *